United States Patent
Yang et al.

(10) Patent No.: US 11,838,922 B2
(45) Date of Patent: *Dec. 5, 2023

(54) ACCESS METHOD AND DEVICE FOR WIRELESS NETWORK

(71) Applicant: ZTE Corporation, Guangdong (CN)

(72) Inventors: Dan Yang, Guangdong (CN); Kaiying Lv, Guangdong (CN); Bo Sun, Guangdong (CN); Weimin Xing, Guangdong (CN)

(73) Assignee: ZTE Corporation, Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 17/516,339

(22) Filed: Nov. 1, 2021

(65) Prior Publication Data

US 2022/0167323 A1 May 26, 2022

Related U.S. Application Data

(63) Continuation of application No. 16/889,516, filed on Jun. 1, 2020, now Pat. No. 11,166,270, which is a
(Continued)

(30) Foreign Application Priority Data

Sep. 30, 2015 (CN) .......................... 201510641446.7

(51) Int. Cl.
*H04W 72/23* (2023.01)
*H04W 74/00* (2009.01)
(Continued)

(52) U.S. Cl.
CPC .......... *H04W 72/23* (2023.01); *H04W 72/121* (2013.01); *H04W 72/30* (2023.01); *H04W 74/00* (2013.01); *H04W 74/006* (2013.01)

(58) Field of Classification Search
CPC ... H04W 72/23; H04W 72/121; H04W 72/30; H04W 74/00; H04W 74/006; H04W 74/02

See application file for complete search history.

(56) References Cited

U.S. PATENT DOCUMENTS

| 2006/0029024 A1 | 2/2006 | Zeng et al. |
| 2007/0025325 A1* | 2/2007 | Kumar ............... H04N 21/6437 375/E7.278 |

(Continued)

FOREIGN PATENT DOCUMENTS

| CN | 101855935 A | 10/2010 |
| CN | 102948091 A | 2/2013 |

(Continued)

OTHER PUBLICATIONS

International Search Report and Written Opinion for International Application No. PCT/CN2016/074588, dated Jun. 21, 2016.

*Primary Examiner* — Kan Yuen
(74) *Attorney, Agent, or Firm* — Perkins Coie LLP

(57) ABSTRACT

Provided are a wireless network access method and apparatus. The method includes: in a wireless network supporting a plurality of channel access approaches, using an access point to maintain a status of a traffic-stream-based or station-based traffic connection with a station; and using the access point to negotiate with the station or transmit control information to the station and to change a channel access approach used by the traffic-stream-based or station-based traffic connection.

14 Claims, 2 Drawing Sheets

Related U.S. Application Data continuation of application No. 15/939,958, filed on Mar. 29, 2018, now Pat. No. 10,674,495, which is a continuation of application No. PCT/CN2016/074588, filed on Feb. 25, 2016.

(51) Int. Cl.
*H04W 72/30* (2023.01)
*H04W 72/121* (2023.01)

(56) References Cited

U.S. PATENT DOCUMENTS

| | | | |
|---|---|---|---|
| 2010/0296503 A1* | 11/2010 | Watanabe | H04W 74/02 370/345 |
| 2013/0279427 A1 | 10/2013 | Wentink | |
| 2014/0119178 A1* | 5/2014 | Zhao | H04W 28/0268 370/230 |
| 2015/0063232 A1* | 3/2015 | Choi | H04W 4/70 370/329 |
| 2015/0146654 A1 | 5/2015 | Chu et al. | |
| 2016/0037576 A1* | 2/2016 | Jeong | H04W 76/16 370/329 |
| 2016/0227533 A1 | 8/2016 | Josiam et al. | |
| 2016/0302232 A1 | 10/2016 | Ghosh | |
| 2018/0139699 A1* | 5/2018 | Choi | H04W 52/0238 |
| 2018/0332540 A1 | 11/2018 | Lou et al. | |

FOREIGN PATENT DOCUMENTS

| | | |
|---|---|---|
| CN | 103826306 A | 5/2014 |
| CN | 104902577 A | 9/2015 |

\* cited by examiner

ACCESS METHOD AND DEVICE FOR WIRELESS NETWORK

CROSS REFERENCE TO RELATED APPLICATIONS

This patent document is a continuation of and claims the benefit of priority to U.S. patent application Ser. No. 16/889,516, filed on Jun. 1, 2020, which is a continuation of and claims benefit of priority to U.S. patent application Ser. No. 15/939,958, filed on Mar. 29, 2018 (now U.S. Pat. No. 10,674,495, issued on Jun. 2, 2020), which is a continuation of International Patent Application No. PCT/CN2016/074588, filed on Feb. 25, 2016, which claims the benefit of priority of Chinese Patent Application No. 201510641446.7, entitled "Access Method and Device for Wireless Network," filed on Sep. 30, 2015. The entire contents of the before-mentioned patent applications are incorporated by reference as part of the disclosure of this application.

TECHNICAL FIELD

The present disclosure relates to the technical field of wireless network access, and particularly, to a wireless network access method and apparatus.

BACKGROUND

At present, with the continuous expansion of the Wireless Local Area Networks (WLAN) industry, the load of a WLAN network is also increasing. Moreover, with the increase in the number of users, a dense network scenario results in a significant drop in network efficiency of the WLAN. Simply increasing a transmission rate does not solve this problem. The multi-user parallel transmission serves as an alternative technology to ensure the network efficiency, which has drawn great attention and research.

In the related art, the multi-user parallel transmission technology includes, for example, a Multi-User Multiple-Input Multiple-Output (MU-MIMO) technology and an Orthogonal Frequency Division Multiple Access (OFDMA) technology. As for the MU-MIMO technology where, multiple layers of MIMO are distributed to multiple stations, a spatial multiplexing technology is used to improve time and frequency utilization rates. The introduction of the OFDMA technology enables multiple stations to perform frequency-division-multiplexing across the entire bandwidth, not only to utilize the selection of frequencies of the stations to better increase the frequency utilization rate, but also to reduce a proportion of an overhead in contending resources for small packet transmissions to an overhead for the entire transmission to increase the time utilization rate.

Multiple non-AP STAs (Stations) in the WLAN transmit data to an access point (AP) at the same time, which is generally referred to as uplink multi-user (UL MU) transmission, where a user is equivalent to a station. Or, the AP simultaneously transmits data to the multiple non-AP STAs, which is referred to as downlink multi-user (DL MU) transmission. A typical frame exchange sequence for the uplink/downlink multi-user transmission is as shown in FIG. 1.

The UL MU transmission requires the AP to perform uplink resource allocation and trigger uplink synchronous transmission in a manner of transmitting a trigger frame or carrying a trigger information field in a radio frame. The trigger frame or trigger information field carries scheduling information of the station, such as identification information of the station, information of time and frequency resources used in uplink transmission of the station, time-frequency offset calibration information of the station. After the AP transmits the trigger frame or the trigger information field, the station receives the trigger frame or trigger information field. If the identification information of the station is carried in the trigger frame or trigger information field, this station is scheduled in this UL MU transmission. If the station has data to be transmitted, the station performs preparation, synchronization according to the time-frequency offset calibration information indicated by the AP, and transmission on allocated time and frequency resources.

In the related art, when a STA adds a traffic stream with an AP, the STA negotiate with the AP to determine its own access approach, which is one of a scheduling access mechanism, a EDCA mechanism, and a hybrid access mechanism of the two mechanisms. In the above process where the AP triggers the uplink synchronous transmission, the access approach employed by the station is the scheduling access mechanism. Before the AP transmits the trigger frame, the STA report a situation about its own buffer, the AP will allocate resources according to the received situation about the buffer of the station and schedule the station to transmit uplink data for one or more times. When the AP schedules resources for the STA, the AP may update the status of the buffer of the corresponding station in real time according to the scheduling information.

However, if the STA employs the EDCA mechanism to transmit data in a process of waiting for being scheduled by the AP, the AP does not obtain a message in real time, and may not update the status of the buffer of the corresponding STA in real time, resulting in inaccuracy in subsequent scheduling of the AP, and even empty scheduling and waste of the resources. Although the above problem can be solved by the station reporting the situation about its own buffer in real time, the real-time reporting of the situation about its own buffer will greatly increase the network load. In addition, when the access approach of the station changes, it is necessary to cut off the added traffic stream connection, and then add a traffic stream and negotiate with the AP again. Such an updating manner is not flexible and reduces the efficiency of the MAC layer. Accordingly, how to improve the utilization rate of resources and the efficiency of the MAC layer is an urgent issue to be solved.

SUMMARY

The present disclosure provides a wireless network access method and apparatus, which solves the technical problem of increasing the utilization rate of resources and the flexibility of a method of updating access approach.

A wireless network access method includes:
in a wireless network supporting a plurality of channel access approaches, using an access point to maintain a status of a traffic-stream-based or station-based traffic connection with a station; and
using the access point to negotiate with the station or transmit control information to the station and to change a channel access approach used by the traffic-stream-based or station-based traffic connection.

In one or more embodiments, the channel access approach includes:
EDCA, data transmission based on polling or access point trigger, and UL MU data transmission based on polling or access point trigger.

In one or more embodiments, the control information includes information for indicating the channel access approach for a traffic stream or a traffic classification.

In one or more embodiments, the control information includes one or more of the following time information of the channel access approach:

a cycle, a start delay and a duration.

In one or more embodiments, the control information includes a priority of the channel access approach or a scheduling access mode.

In one or more embodiments, the control information includes at least one of the following information:

a traffic classification, an indication of aggregation, a user priority, a response strategy to traffic stream, and scheduling information.

In one or more embodiments, the step of using the access point to maintain the status of the traffic-stream-based or station-based traffic connection with the station includes:

using the access point to maintain a parameter of the traffic-stream-based or station-based traffic connection with the station, where the parameter includes a connection identification number.

In one or more embodiments, the step of using the access point to negotiate with the station or transmit the control information to the station and to change the channel access approach used by the traffic-stream-based or station-based traffic connection includes at least one of:

changing the channel access approach used by the traffic-stream-based or station-based traffic connection based on information for indicating whether the channel access approach for a specified traffic stream or a specified traffic classification of the station is an EDCA mechanism in the control information;

changing the channel access approach used by the traffic-stream-based or station-based traffic connection based on information for indicating whether the channel access approach for the specified traffic stream or the specified traffic classification of the station is a scheduling access mechanism in the control information;

changing the channel access approach used by the traffic-stream-based or station-based traffic connection based on information for indicating whether the channel access approach for the specified traffic stream or the specified traffic classification of the station is a hybrid access mechanism of the scheduling access mechanism and the EDCA mechanism in the control information;

changing the channel access approach used by the traffic-stream-based or station-based traffic connection based on information for indicating whether the channel access approach for the specified traffic stream or the specified traffic classification of the station is the EDCA mechanism in the control information when a current channel access approach for the traffic stream or the traffic classification is the scheduling access mechanism; and changing the channel access approach used by the traffic-stream-based or station-based traffic connection based on information for indicating a prohibition of the EDCA mechanism to be used as the channel access approach for the specified traffic stream or the specified traffic classification of the station in the control information when the current channel access approach is the hybrid access mechanism of the scheduling access mechanism and the EDCA mechanism;

where the scheduling access mechanism includes: data transmission based on access point trigger or polling, UL MU data transmission based on access point trigger or polling.

In one or more embodiments, the step of using the access point to negotiate with the station and to change the channel access approach used by the traffic-stream-based or station-based traffic connection includes:

using the access point to negotiate with the station through an interaction using an ADDTS request frame and an ADDTS response frame and to change the channel access approach used by the traffic-stream-based or station-based traffic connection.

In one or more embodiments, the step of using the access point to transmit the control information to the station and to change the channel access approach used by the traffic-stream-based or station-based traffic connection includes:

using the access point to transmit the control information to the station via a public downlink broadcast message or a unicast message.

In one or more embodiments, the public downlink broadcast message includes a beacon frame, a probe response frame, or a traffic stream change frame.

In one or more embodiments, the unicast message includes an ADDTS response frame or a traffic stream change frame carrying TSPEC information.

A wireless network access method includes:

using a station to receive control information transmitted by an access point;

using the station to determine a changed channel access approach according to the control information; and using the station to transmit data of a specified traffic stream or a specified traffic classification to the access point according to the changed channel access approach.

In one or more embodiments, the step of using the station to determine the changed channel access approach according to the control information includes:

when the control information includes an indication that the channel access approach for the specified traffic stream or the specified traffic classification of the station is allowed to be an approach A; and when a traffic stream is added with the access point after the control information is received, where the channel access approach for the station to request for the traffic stream is an approach B, the channel access approach for the access point to response to the traffic stream is the approach A, determining that the channel access approach for the station to transmit the data to the access point is the approach A; or when the control information includes an indication that the channel access approach for the specified traffic stream or the specified traffic classification of the station is allowed to be the approach A; and when the traffic stream is added with the access point after the control information is received, where the channel access approach for the station to add the traffic stream is the approach B, the channel access approach for the access point to respond to the traffic stream is the approach B, determining that the channel access approach for the station to transmit the data to the access point is the approach A or the approach B.

In one or more embodiments, the step of using the station to determine the changed channel access approach according to the control information includes:

when the station adds a traffic stream with the access point, the channel access approach for requesting the traffic stream is an approach B, the control information includes an indication that the channel access approach for the specified traffic stream or the specified traffic classification of the station is allowed to be an approach A and is responded by the access point, determining the channel access approach for the station to transmit the data of the traffic stream is the approach A; or when the station adds a traffic stream with the access point, the channel access approach for requesting for the traffic stream is the approach A, the control information includes an indication that the channel access approach for the specified traffic stream or the specified traffic classification of the station is allowed to be the approach A and is responded by the access point, determining the channel access approach for the station to transmit the data of the traffic stream is the approach A.

In one or more embodiments, the step of using the station to determine the changed channel access approach according to the control information includes:

when the station adds a traffic stream with the access point, an access approach is determined to be an approach B through negotiation, and after the traffic stream is added and when the access point transmits the control information including an indication that the channel access approach for the specified traffic stream or the specified traffic classification of the station is allowed to be an approach A, determining the channel access approach for the station to transmit the data of the traffic stream is the approach A or the approach B.

In one or more embodiments, the approach A and the approach B are the same or different channel access mechanisms; where the channel access mechanisms include:

a scheduling access mechanism;
an uplink EDCA mechanism; and
a hybrid access mechanism of the scheduling access mechanism and the uplink EDCA mechanism.

In one or more embodiments, the scheduling access mechanism includes: data transmission based on polling or access point trigger, and UL MU data transmission based on polling or access point trigger.

In one or more embodiments, the method further includes:

using the station to determine whether to access a wireless network containing the access point according to a channel access approach allowable for the specified traffic stream or the specified traffic classification of the station; and/or using the station to determine whether to enable the specified traffic stream or the specified traffic classification according to the channel access approach allowable for the specified traffic stream or the specified traffic classification of the station.

In one or more embodiments, the control information includes a start delay, the step of using the station to determine the changed channel access approach according to the control information includes:

using the station to change a channel access approach for a traffic-stream-based or station-based traffic connection at a moment indicated by the start delay.

In one or more embodiments, the control information includes a duration, the step of using the station to determine the changed channel access approach according to the control information includes:

using the station to change a channel access approach for a traffic-stream-based or station-based traffic connection when the duration ends.

A wireless network access apparatus is located in an access point and includes a changing module, the changing module is configured to: in a wireless network supporting a plurality of channel access approaches, maintain a status of a traffic-stream-based or station-based traffic connection with a station; negotiate with the station or transmit control information to the station, and change a channel access approach used by the traffic-stream-based or station-based traffic connection.

In one or more embodiments, the channel access approach includes:

EDCA, data transmission based on polling or access point trigger, and UL MU data transmission based on polling or access point trigger.

In one or more embodiments, the control information includes information for indicating the channel access approach for a traffic stream or a traffic classification.

In one or more embodiments, the control information includes one or more of the following time information of the channel access approach:

a cycle, a start delay and a duration.

In one or more embodiments, the control information includes a priority of the channel access approach or a scheduling access mode.

In one or more embodiments, the control information includes at least one of the following information:

a traffic classification, an indication of aggregation, a user priority, a response strategy to traffic stream, and scheduling information.

In one or more embodiments, the changing module is configured to maintain the status of the traffic-stream-based or station-based traffic connection with the station in the following manner:

maintaining a parameter of the traffic-stream-based or station-based traffic connection with the station, where the parameter includes a connection identification number.

In one or more embodiments, the changing module is configured to negotiate with the station or transmit the control information to the station and to change the channel access approach used by the traffic-stream-based or station-based traffic connection in at least one of the following manners:

changing the channel access approach used by the traffic-stream-based or station-based traffic connection based on information for indicating whether the channel access approach for a specified traffic stream or a specified traffic classification of the station is an EDCA mechanism in the control information;

changing the channel access approach used by the traffic-stream-based or station-based traffic connection based on information for indicating whether the channel access approach for the specified traffic stream or the specified traffic classification of the station is a scheduling access mechanism in the control information;

changing the channel access approach used by the traffic-stream-based or station-based traffic connection based on information for indicating whether the channel access approach for the specified traffic stream or the specified traffic classification of the station is a hybrid access mechanism of the scheduling access mechanism and the EDCA mechanism in the control information;

changing the channel access approach used by the traffic-stream-based or station-based traffic connection based on information for indicating whether the channel access approach for the specified traffic stream or the specified traffic classification of the station is the EDCA mechanism in the control information when a current channel access approach for the traffic stream or the traffic classification is the scheduling access mechanism; and changing the channel access approach used by the traffic-stream-based or station-based traffic connection based on information for indicating a prohibition of the EDCA mechanism to be used as the channel access approach for the specified traffic stream or the specified traffic classification of the station in the control information when the current channel access approach is the hybrid access mechanism of the scheduling access mechanism and the EDCA mechanism, where the scheduling access mechanism includes: data transmission based on access point trigger or polling, UL MU data transmission based on access point trigger or polling.

In one or more embodiments, the changing module is configured to negotiate with the station and to change the channel access approach used by the traffic-stream-based or station-based traffic connection in the following manner:

negotiating with the station through an interaction using an ADDTS request frame and an ADDTS response frame and to change the channel access approach used by the traffic-stream-based or station-based traffic connection.

In one or more embodiments, the changing module is configured to change a channel access approach used by the traffic stream-based or station-based traffic connection by transmitting control information to the station in with the following manner:

transmitting the control information to the station via a public downlink broadcast message or a unicast message.

In one or more embodiments, the public downlink broadcast message includes a beacon frame, a probe response frame, or a traffic stream change frame.

In one or more embodiments, the unicast message includes an ADDTS response frame or a traffic stream change frame carrying TSPEC information.

A wireless network access apparatus is located in a station and includes a receiving module, a determining module and a transmitting module, where the receiving module is configured to receive control information transmitted by an access point;

the determining module is configured to determine a changed channel access approach according to the control information, and the transmitting module is configured to transmit data of a specified traffic stream or a specified traffic classification to the access point according to the changed channel access approach.

In one or more embodiments, the determining module is configured to determine the changed channel access approach according to the control information in the following manners:

when the control information includes an indication that the channel access approach for the specified traffic stream or the specified traffic classification of the station is allowed to be an approach A; and when a traffic stream is added with the access point after the control information is received, where the channel access approach for the station to request for the traffic stream is an approach B, the channel access approach for the access point to response to the traffic stream is the approach A, determining that the channel access approach for the station to transmit the data to the access point is the approach A; or when the control information includes an indication that the channel access approach for the specified traffic stream or the specified traffic classification of the station is allowed to be the approach A; and when the traffic stream is added with the access point after the control information is received, where the channel access approach for the station to add the traffic stream is the approach B, the channel access approach for the access point to respond to the traffic stream is the approach B, determining that the channel access approach for the station to transmit the data to the access point is the approach A or the approach B.

In one or more embodiments, the determining module is configured to determine the changed channel access approach according to the control information in the following manners:

when the station adds a traffic stream with the access point, the channel access approach for requesting the traffic stream is an approach B, the control information includes an indication that the channel access approach for the specified traffic stream or the specified traffic classification of the station is allowed to be an approach A and is responded by the access point, determining the channel access approach for the station to transmit the data of the traffic stream is the approach A; or when the station adds a traffic stream with the access point, the channel access approach for requesting for the traffic stream is the approach A, the control information includes an indication that the channel access approach for the specified traffic stream or the specified traffic classification of the station is allowed to be the approach A and is responded by the access point, determining the channel access approach for the station to transmit the data of the traffic stream is the approach A.

In one or more embodiments, the determining module is configured to determine the changed channel access approach according to the control information in the following manner:

when the station adds a traffic stream with the access point, an access approach is determined to be an approach B through negotiation, and after the traffic stream is added and when the access point transmits the control information including an indication that the channel access approach for the specified traffic stream or the specified traffic classification of the station is allowed to be an approach A, determining the channel access approach for the station to transmit the data of the traffic stream is the approach A or the approach B.

In one or more embodiments, the approach A and the approach B are the same or different channel access mechanisms; where the channel access mechanisms include:

a scheduling access mechanism;

an uplink EDCA mechanism; and a hybrid access mechanism of the scheduling access mechanism and the uplink EDCA mechanism.

In one or more embodiments, the scheduling access mechanism includes: data transmission based on polling or access point trigger, and UL MU data transmission based on polling or access point trigger.

In one or more embodiments, the apparatus further includes a processing module, the processing module is configured to determine whether to access a wireless network containing the access point according to a channel access approach allowable for the specified traffic stream or the specified traffic classification of the station; and/or determine whether to enable the specified traffic stream or the specified traffic classification according to the channel access approach allowable for the specified traffic stream or the specified traffic classification of the station.

In one or more embodiments, the control information includes a start delay, the determining module is configured to determine the changed channel access approach according to the control information in the following manner:

the station changes a channel access approach for a traffic-stream-based or station-based traffic connection at a moment indicated by the start delay.

In one or more embodiments, the control information includes a duration, the determining module is configured to determine the changed channel access approach according to the control information in the following manner:

the station changes a channel access approach for a the traffic-stream-based or station-based traffic connection when the duration ends.

In the technical solution of the present disclosure, an access point in a wireless network notifies a station of a channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

DETAILED DESCRIPTION

Figure 1:
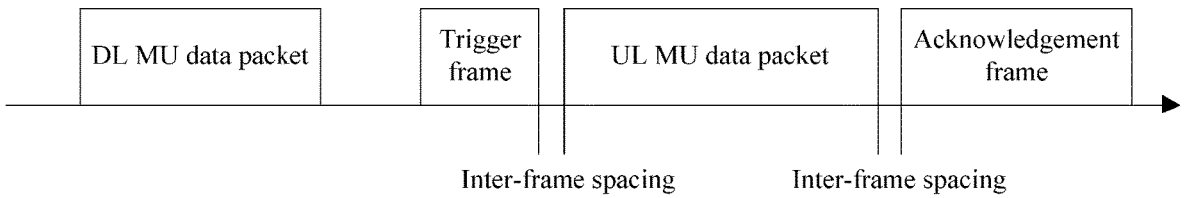
FIG. 1 is an example diagram of frame exchange of multi-user parallel transmission in the related art.

The following is an overview of a subject matter detailed in the present disclosure. This summary is not intended to limit a protection scope of claims.

The present disclosure will be further described in detail below with reference to accompanying drawings and specific embodiments. It is to be noted that, in the case of no conflict, the embodiments in the present application and the features in the embodiments may be combined with each other arbitrarily.

An embodiments of present disclosure provides a wireless network access method, including:

in a wireless network supporting a plurality of channel access approaches, using an access point to maintain a status of a traffic-stream-based or station-based traffic connection with a station; and using the access point to negotiate with the station or transmit control information to the station and to change a channel access approach used by the traffic-stream-based or station-based traffic connection.

In the method embodiment according to the present disclosure, the access point in a wireless network notifies the station of the channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

In addition, when the access approach of the station in the related art changes, it is necessary to cut off the added traffic connection, and then add a traffic stream and negotiate with the AP again. Such an updating manner is not flexible and reduces the efficiency of the MAC layer. The method provided by the present disclosure solves the above problem as well.

The channel access approaches include: EDCA, data transmission based on polling or access point trigger, and UL MU data transmission based on polling or access point trigger.

The control information includes information for indicating the channel access approach for a traffic stream or a traffic classification.

The control information includes one or more of the following time information of the channel access approach: a cycle, a start delay and a duration.

The control information includes a priority of the channel access approach or a scheduling access mode.

The control information includes at least one of the following information: a traffic classification, an indication of aggregation, a user priority, a response strategy to traffic stream, and scheduling information.

In other words, the control information may include: information for indicating the channel access approach for the traffic stream or the traffic classification; one or more pieces of time information of the channel access approach; a priority of the channel access approach or a scheduling access mode; one or more of traffic classification, an indication of aggregation, a user priority, a response strategy to traffic information, and scheduling information; or may include all of them.

In the process where the access point maintains the status of the traffic-stream-based or station-based traffic connection with the station, the access point maintains a parameter of an existing traffic connection with the access point, where the parameter includes a connection identification number.

The control information used to change the channel access approach further includes:

information for indicating whether the channel access approach for a specified traffic stream or a specified traffic classification of the station is channel access mechanism; and/or information for indicating whether the channel access approach for a specified traffic stream or a specified traffic classification of the station is scheduling access mechanism; and/or information for indicating whether the channel access approach for a specified traffic stream or a specified traffic classification of the station is hybrid access mechanism of the scheduling access mechanism and the EDCA mechanism; and/or information for indicating whether the channel access approach for a specified traffic stream or a specified traffic classification of the station is the EDCA mechanism when a current channel access approach for the traffic stream or the traffic classification is the scheduling access mechanism; and/or information for indicating a prohibition of the EDCA mechanism to be used as the channel access approach for a specified traffic stream or a specified traffic classification of the station when a current channel access approach is the hybrid access mechanism of the scheduling access mechanism and the EDCA mechanism, the scheduling access mechanism includes data transmission based on access point trigger or polling, UL MU data transmission based on access point trigger or polling.

The negotiation with the station refers to an interaction using an ADDTS request frame and an ADDTS response frame.

The control information is transmitted via a public downlink broadcast message or a unicast message directed to the station.

The public downlink broadcast message is a beacon frame or a probe response frame.

The unicast message is an ADDTS response frame carrying TSPEC information.

Figure 2:
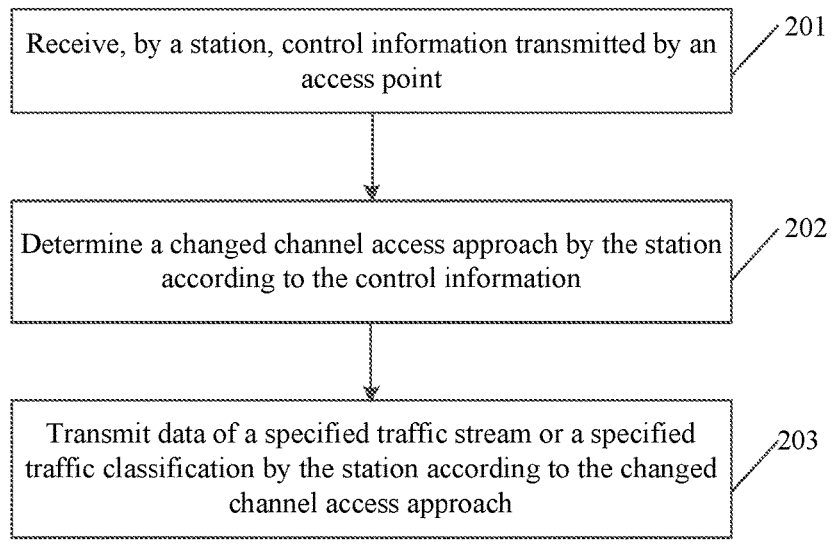
FIG. 2 is a flow diagram of an embodiment of a wireless network access method according to the present disclosure.

FIG. 2 is a flow diagram of an embodiment of a wireless network access method according to the present disclosure. As shown in FIG. 2, the method includes steps described below.

In step 201, a station receives control information transmitted by an access point.

In step 202, the station determines a changed channel access approach according to the control information.

In step 203, the station transmits data of a specified traffic stream or a specified traffic classification to the access point according to the changed channel access approach.

In the method embodiment according to the present disclosure, the access point in a wireless network notifies the station of the channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

That the station determines a changed channel access approach according to the control information includes:

when the control information includes an indication that the channel access approach for the specified traffic stream or the specified traffic classification of the station is allowed to be an approach A; and when a traffic stream is added with the access point after the control information is received, where the channel access approach for the station to request for the traffic stream is an approach B, the channel access approach for the access point to response to the traffic stream is the approach A, the station determines that the channel access approach for the station to transmit the data to the access point is the approach A; or when the control information includes an indication that the channel access approach for the specified traffic stream or the specified traffic classification of the station is allowed to be the approach A; and when the traffic stream is added with the access point after the control information is received, where the channel access approach for the station to add the traffic stream is the approach B, the channel access approach for the access point to respond to the traffic stream is the approach B, the station determines that the channel access approach for the station to transmit the data to the access point is the approach A or the approach B.

That the station determines a changed channel access approach according to the control information includes:

when the station adds a traffic stream with the access point, the channel access approach for requesting the traffic stream is an approach B, the control information includes an indication that the channel access approach for the specified traffic stream or the specified traffic classification of the station is allowed to be an approach A and is responded by the access point, the station determines that the channel access approach for the station to transmit the data of the traffic stream is the approach A; or when the station adds a traffic stream with the access point, the channel access approach for requesting for the traffic stream is the approach A, the control information includes an indication that the channel access approach for the specified traffic stream or the specified traffic classification of the station is allowed to be the approach A and is responded by the access point, the station determines that the channel access approach for the station to transmit the data of the traffic stream is the approach A.

That the station determines a changed channel access approach according to the control information includes:

when the station adds a traffic stream with the access point, an access approach is determined to be an approach B through negotiation, and after the traffic stream is added and when the access point transmits the control information including an indication that the channel access approach for the specified traffic stream or the specified traffic classification of the station is allowed to be an approach A, the station determines that the channel access approach for the station to transmit the data of the traffic stream is the approach A or the approach B.

The approach A and the approach B are the same or different channel access mechanisms; where the channel access mechanisms include:

a scheduling access mechanism;

an uplink EDCA mechanism; and a hybrid access mechanism of the scheduling access mechanism and the uplink EDCA mechanism.

The scheduling access mechanism includes: data transmission based on polling or access point trigger, and UL MU data transmission based on polling or access point trigger.

The method further includes:

the station determines whether to access a wireless network containing the access point according to a channel access approach allowable for the specified traffic stream or the specified traffic classification of the station; and/or the station determines whether to enable the specified traffic stream or the specified traffic classification according to the channel access approach allowable for the specified traffic stream or the specified traffic classification of the station.

A First Embodiment

Figure 3:
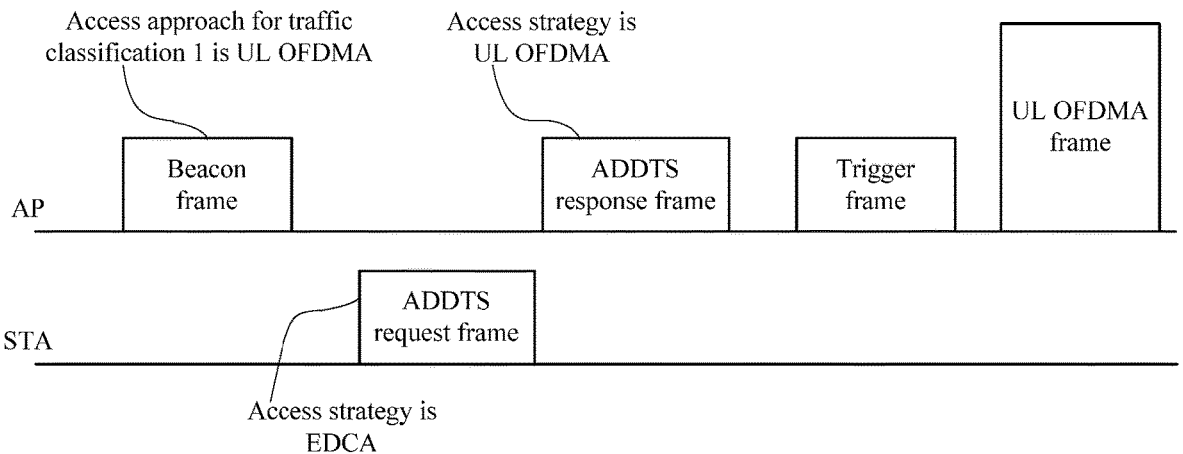
FIG. 3 is an example diagram of frame exchange of transmission according to a first embodiment of the present disclosure.

FIG. 3 is an example diagram of frame exchange of transmission according to a first embodiment of the present disclosure. In the schematic diagram as shown in FIG. 3, an AP notifies, in a Beacon frame and a Probe Response frame transmitted by the AP, that access approach for all uplink traffic streams or traffic classifications (TCLAS) is a UL OFDMA access mechanism; and when a STA adds a traffic stream (TS) of a traffic classification 1 with the AP, the STA transmits an add traffic stream (ADDTS) request frame to the AP, where the ADDTS request includes a traffic specification (TSPEC) element, and an access strategy field in the traffic specification element is set to an enhanced distributed channel access (EDCA).

As shown in FIG. 3, after the AP receives the ADDTS request frame, the AP responds with an ADDTS response frame, where the access strategy field in the TSPEC element carried in the ADDTS response frame is set to the UL OFDMA access mechanism, and the STA can only use the UL OFDMA access mechanism when transmitting data of the traffic classification 1.

Since the AP knows that the data, which is transmitted by the STA, of the traffic classification 1 can only employ the UL OFDMA access mechanism, the AP updates a situation, which is stored in the AP, about a buffer of the STA each time uplink data, which is transmitted by the STA, of the traffic classification 1 is scheduled.

A Second Embodiment

Figure 4:
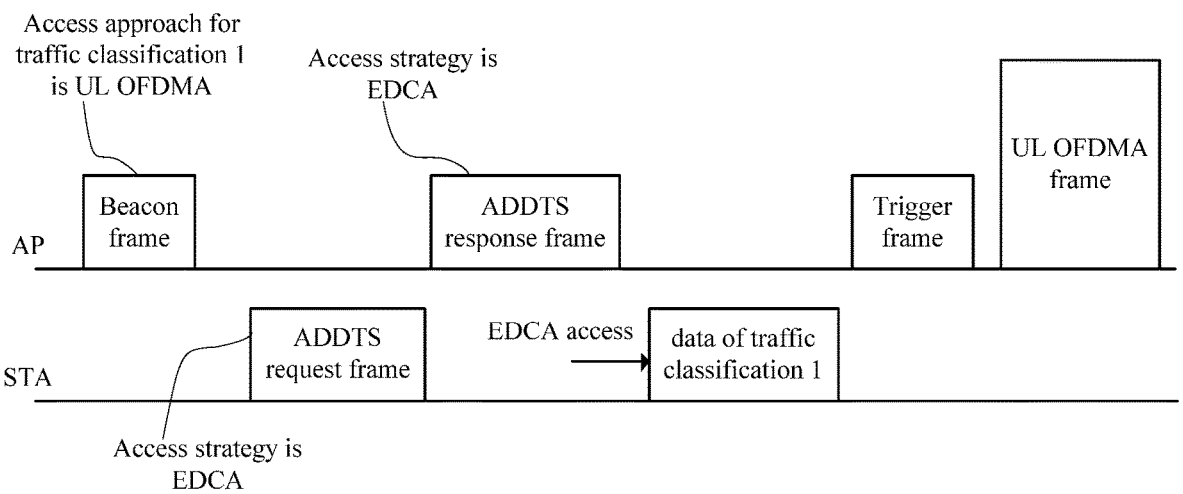
FIG. 4 is an example diagram of frame exchange of transmission according to a second embodiment of the present disclosure.

FIG. 4 is an example diagram of frame exchange of transmission according to a second embodiment of the present disclosure. In the schematic diagram as shown in FIG. 4, an AP notifies, in a Beacon frame and a Probe Response frame transmitted by the AP, the access approach for multiple traffic classifications, where the AP notifies that traffic classification 2 employs UL OFDMA access mechanism; and when a STA adds a traffic stream of the traffic classification 2 with the AP, the STA transmits an ADDTS request frame to the AP, where the ADDTS request frame includes a TSPEC element, and an access strategy field in the TSPEC element is set to EDCA mechanism.

After receiving the ADDTS request frame, the AP responds to the STA with an ADDTS response frame, where the access strategy field in the TSPEC element carried in the ADDTS response frame is set to the EDCA mechanism.

The STA may transmit the data of the traffic classification 2 using the UL OFDMA access mechanism or the EDCA mechanism.

Since the AP know that the STA may transmit the data of the traffic classification 2 using the EDCA mechanism, the AP will track a situation of the transmission of the data of the traffic classification 2 by the STA, and update a situation, which is stored by the AP, about a buffer of the STA according to a tracking result so as to avoid repeated scheduling, thereby increasing the utilization rate of resources.

A Third Embodiment

When a STA adds a traffic stream 3 with an AP through an ADDTS request frame and an ADDTS response frame, an access strategy field in a TSPEC element carried in the ADDTS request frame transmitted by the STA is set to an access approach based on EDCA, and the AP responds with the ADDTS response frame, in which an access strategy is set to a UL OFDMA access mechanism, then the STA can only use the UL OFDMA access mechanism for transmitting the data of the traffic stream 3.

Since the AP knows that the STA can only use the UL OFDMA access mechanism for transmitting the data of the traffic classification 3, the AP updates a situation, which is stored by the AP, about a buffer of the STA each time uplink data transmitted by the STA is scheduled.

A Fourth Embodiment

When a STA adds a traffic stream 4 with an AP through an ADDTS request frame and an ADDTS response frame, an access strategy field in a TSPEC element carried in the ADDTS request frame transmitted by the STA is set to an UL OFDMA access mechanism, and the AP responds with the ADDTS response frame, and an access policy in the response frame is set to the UL OFDMA access mechanism, then the STA can only use the UL OFDMA access mechanism for transmitting the data of the traffic stream 4.

Since the AP knows that the STA can only use the UL OFDMA access mechanism for transmitting the data of the traffic classification 4, the AP updates a situation, which is stored by the AP, about a buffer of the STA each time uplink data transmitted by the STA is scheduled.

A Fifth Embodiment

When a STA adds a traffic stream 5 with an AP through an ADDTS request frame and an ADDTS response frame, an access strategy field in a TSPEC element carried in the ADDTS request frame transmitted by the STA is set to an access approach based on EDCA, the AP responds with the ADDTS response frame, in which the access strategy is set to the access approach based on EDCA. After responding with the response frame, the AP notifies in a beacon that the access approach of the traffic stream 5 is a UL OFDMA access mechanism, and then the STA can only use the UL OFDMA access mechanism for subsequently transmitting data of the traffic stream 5.

Since the AP knows that the data of the traffic classification 5 transmitted by the STA can only use the UL OFDMA access mechanism, the AP updates a situation, which is stored by the AP, about a buffer of the STA each time uplink data transmitted by the STA is scheduled.

A Sixth Embodiment

An AP notifies access approaches of multiple traffic classifications in a Beacon frame and a Probe Response frame transmitted by the AP, where the access approach for the notified traffic classification 6 is an EDCA mechanism.

When a STA adds a traffic stream of the traffic classification 6 with the AP, the STA transmits an ADDTS request frame to the AP, where the ADDTS request frame includes a TSPEC element, and an access strategy field in the TSPEC element is set to an EDCA mechanism. After receiving the ADDTS request frame, the AP responds with an ADDTS response frame, where an access strategy field in the TSPEC element carried in the ADDTS response frame is set to the EDCA mechanism. The STA may only use the EDCA mechanism for transmitting the data of the traffic classification 6.

Since the AP knows that the STA can only employ the EDCA mechanism for transmitting the data of the traffic classification 6, the AP may not store a situation of a buffer of the STA for storing the data of the traffic classification 6, and may not allocate resources to the STA, thereby increasing the utilization rate of resources.

A Seventh Embodiment

An AP notifies access approaches of multiple traffic classifications in a Beacon frame and a Probe Response frame transmitted by the AP, where the access approach for the notified traffic classification 7 is an EDCA mechanism.

When a STA adds a traffic stream of the traffic classification 7 with the AP, the STA transmits an ADDTS request frame to the AP, where the ADDTS request frame includes a TSPEC element, in which an access strategy field is set to an EDCA mechanism. After receiving the ADDTS request frame, the AP responds with an ADDTS response frame, where an access strategy field in the TSPEC element carried in the ADDTS response frame is set to a UL OFDMA access mechanism. The STA may use the EDCA mechanism or the UL OFDMA access mechanism for transmitting the data of the traffic classification 7.

Since the AP knows that the STA may employ the EDCA mechanism or the UL OFDMA access mechanism for transmitting the data of the traffic classification 7, the AP will track a situation of the transmission of the data of the traffic classification 7 by the STA, and update a situation, which is stored by the AP, about a buffer of the STA according to a tracking result so as to avoid repeated scheduling, thereby increasing the utilization rate of resources.

An Eighth Embodiment

An AP notifies access approaches of multiple traffic classifications in a Beacon frame and a Probe Response frame transmitted by the AP, where the notified traffic classification 8 is a UL OFDMA access mechanism.

When a STA adds a traffic stream with the AP, the STA transmits data of the traffic stream of the traffic classification 8 by directly using the access approach informed by the AP; in other words, the STA transmits using the UL OFDMA access mechanism.

A Ninth Embodiment

When a STA adds a traffic stream 9 with an AP through an ADDTS request frame and an ADDTS response frame, an access strategy field in a TSPEC element carried in the ADDTS request frame transmitted by the STA is set to the EDCA mechanism, the AP responds with the ADDTS response frame, in which an access strategy is set to a hybrid access mechanism of the EDCA mechanism and the scheduling access mechanism.

After the traffic stream is added, multiple stations each transmits a situation of buffering its own uplink data to the AP, and the AP will transmit a trigger frame to trigger the multiple stations to simultaneously transmit uplink to the AP using the OFDMA mechanism, thereby increasing the transmission efficiency, so that the AP transmits a radio frame to the STA. The radio frame carries control information, which indicates that the STA is prohibited from transmitting the data of the traffic stream 9 using the EDCD mechanism.

After receiving the control information, the STA does not transmit the data of the traffic stream 9 using the EDCA mechanism any more, but waits for the trigger frame from the AP. After receiving the trigger frame, the STA transmits the data of the traffic stream 9 by employing the scheduling access mechanism.

A Tenth Embodiment

When a STA adds a traffic stream 10 with an AP through an ADDTS request frame and an ADDTS response frame, the STA negotiates with the AP and determines that the STA transmits the STA transmits the traffic stream or the traffic classification 10 using the scheduling access mechanism of UL OFDMA.

After the traffic stream is added, the AP transmits a radio frame carrying control information to notify that all uplink traffic streams using the scheduling access mechanism are also allowed to employ the EDCA mechanism. After receiving the control information, the STA may transmit data of the traffic stream or traffic classification 10 data using the EDCA mechanism.

Since the AP knows that the STA may transmit the data of the traffic stream or traffic classification 10 using the EDCA or UL OFDMA access mechanism, the AP will track a situation of the transmission of the data of the traffic stream or traffic classification 10, and update a situation, which is stored by the AP, about a buffer of the STA according to a tracking result. If the data of the traffic stream or traffic classification 10 has been transmitted using the access approach of EDCA, the AP does not allocate uplink resources to the traffic stream or traffic classification 10 any more, thereby avoiding repeated scheduling and increasing the utilization rate of resources.

An Eleventh Embodiment

In a tunneled direct-link setup (TDLS), a STA 1 needs to transmit data to a STA 2. Before transmitting the data, the STA 1 transmits an ADDTS request frame to an AP. The AP responds with an ADDTS response frame to indicate that the access approach for the STA 1 to transmit traffic classification 11 is a scheduling access mechanism. Afterwards, because the number of stations in a current traffic stream set is reduced, and the AP allows multiple stations to transmit data using the EDCA mechanism. Thus, the AP transmits a traffic stream update frame carrying control information to the STA 1 to indicate that the access approach for the STA 1 to transmit the traffic classification 11 may be the EDCA mechanism, then in a subsequent process, the STA 1, the STA 2 and the AP do not cut off existing traffic stream connections and keep identification numbers of the added traffic stream connections unchanged. The STA 1 may transmit the data of the traffic classification 11 to the STA 2 using the EDCA or scheduling access mechanism.

A Twelfth Embodiment

In a BSS, a STA 1 associates with an AP. According to the status of network load and the capability of the AP, the AP notifies the STA 1 via an association response frame that the STA 1 may transmit a traffic stream using the EDCA approach or UL MU data transmission triggered based on a trigger frame.

As a large number of stations such as a STA 2 and a STA 3 are added, the network load becomes heavy, and the AP transmits a radio frame carrying a notification for indicating the access approach to notify the STA 1 that only the UL MU data transmission triggered based on the trigger frame is used.

Because the STA 2 and the STA 3 have high requirements for real-time performance on the traffic stream, the AP chooses to transmit the radio frame carrying the notification for indicating the access approach to the STA 2 and the STA 3, so as to notify the STA 2 and the STA 3 that they may still employ the UL MU data transmission triggered based on the trigger frame or the EDCA approach.

After receiving the above radio frame, the STA 1 does not use EDCA to transmit data any more, but waits for the AP to transmit the trigger frame and then transmit the data using the UL MU data transmission.

After receiving the above radio frame, the STA 2 and the STA 3 may still employ the EDCA approach, or may wait for the AP to trigger uplink transmission.

A Thirteenth Embodiment

In a BSS, a STA and an AP determine that their own access approaches are UL MU data transmission triggered based on a trigger frame or EDCA approach through an ADDTS request frame and an ADDTS response frame.

Afterwards, the AP determines that a network load of a current BSS becomes heavy. The AP carries a start delay T1 in a beacon frame, and notifies all the stations within the BSS that each of the stations updates its own access approach into the UL MU data transmission triggered based on the trigger frame at a moment which is T1 later than the beacon frame is received.

After the moment which is T1 later than the beacon is received, the stations within the BSS do no employ the EDCA approach any more, but waits for the AP to transmit the trigger frame that triggers uplink multi-user transmission.

A Fourteenth Embodiment

In a BSS, when a STA 1 and a STA 2 respectively associate with an AP, the AP provides that an access approach of the STA 1 is UL MU data transmission or EDCA approach through the control information carried in an associated response frame. The access approach of the STA 2 is only the EDCA approach.

The AP may use the control information in the above association response frame (or in the control information carried in a beacon) to indicate the user priority corresponding to the access approaches used by the station. In other words, when the station, which is allowed to use the UL MU data transmission triggered based on a trigger frame or the EDCA approach, uses the EDCA approach, an EDCA parameter set used for the EDCA approach is SET 1, which includes a transmission opportunity limit, the minimum contention window CWmin1, and the maximum contention window CWmax1; when the station, which is allowed to employ the EDCA approach only, uses the EDCA approach, EDCA parameter set is SET 2, which includes a transmission opportunity limit, the minimum contention window CWmin2, and the maximum contention window CWmax2. Among them, values of corresponding parameter of the SET 1 and the SET 2 are different. In other words, the transmission opportunity limits of the SET 1 and the SET 2 are different, the CWmin1 and CWmin2 of the SET 1 and the SET 2 are different, and the CWmax1 and the CWmax2 of the SET 1 and the SET 2 are different.

The present disclosure provides a wireless network access apparatus, which is located in an access point and includes:

a changing module, which is configured to: in a wireless network supporting a plurality of channel access approaches, maintain a status of a traffic-stream-based or station-based traffic connection with a station; negotiate with the station or transmit control information to the station, and change a channel access approach used by the traffic-stream-based or station-based traffic connection.

The channel access approach includes EDCA, data transmission based on polling or access point trigger, and UL MU data transmission based on polling or access point trigger.

The control information includes information for indicating the channel access approach for a traffic stream or a traffic classification.

The control information includes one or more of the following time information of the channel access approach: a cycle, a start delay and a duration.

The control information includes a priority of the channel access approach or a scheduling access mode.

The control information includes at least one of the following information: a traffic classification, an indication of aggregation, a user priority, a response strategy to traffic stream, and scheduling information.

That the access point maintains the status of the traffic-stream-based or station-based traffic connection with a station means that the station maintains a parameter of an existing traffic connection with the access point, where the parameter includes a connection identification number.

The control information used to change the channel access approach includes:

information for indicating whether the channel access approach for a specified traffic stream or a specified traffic classification of the station is channel access mechanism; and/or information for indicating whether the channel access approach for a specified traffic stream or a specified traffic classification of the station is scheduling access mechanism; and/or information for indicating whether the channel access approach for a specified traffic stream or a specified traffic classification of the station is hybrid access mechanism of the scheduling access mechanism and the EDCA mechanism; and/or information for indicating whether the channel access approach for a specified traffic stream or a specified traffic classification of the station is the EDCA mechanism when a current channel access approach for the traffic stream or the traffic classification is the scheduling access mechanism; and/or information for indicating a prohibition of the EDCA mechanism to be used as the channel access approach for a specified traffic stream or a specified traffic classification of the station when a current channel access approach is the hybrid access mechanism of the scheduling access mechanism and the EDCA mechanism, the scheduling access mechanism includes data transmission based on access point trigger or polling, UL MU data transmission based on access point trigger or polling.

For the wireless network access apparatus, the negotiation with the station refers to an negotiation through interaction using an ADDTS request frame and an ADDTS response frame.

The control information is transmitted via a public downlink broadcast message, or a unicast message transmitted to the station.

The public downlink broadcast message includes a beacon frame, a probe response frame or a traffic stream change frame.

The unicast message is an ADDTS response frame or a traffic stream change frame carrying traffic specification (TSPEC) information.

In the apparatus embodiment according to the present disclosure, the access point in a wireless network notifies the station of the channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

Figure 5:
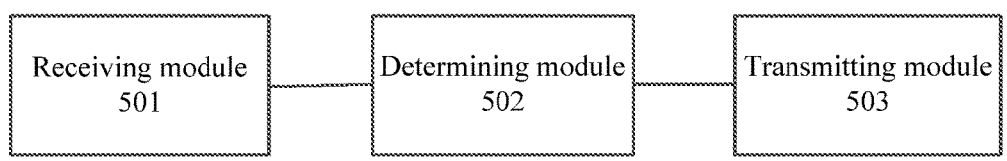
FIG. 5 is a diagram showing a structure of an embodiment of a wireless network access apparatus according to the present disclosure.

FIG. 5 is a diagram showing a structure of an embodiment of a wireless network access apparatus according to the present disclosure. As shown in FIG. 5, the apparatus is located in a station side and includes:

a receiving module 501, which is configured to receive control information transmitted by an access point;

a determining module 502, which is configured to determine a changed channel access approach according to the control information, and a transmitting module 503, which is configured to transmit data of a specified traffic stream or a specified traffic classification to the access point according to the changed channel access approach.

The determining module 503 is configured:

when the control information includes an indication that the channel access approach for the specified traffic stream or the specified traffic classification of the station is allowed to be an approach A; and when a traffic stream is added with the access point after the control information is received, where the channel access approach for the station to request for the traffic stream is an approach B, the channel access approach for the access point to response to the traffic stream is the approach A, to determine that the channel access approach for the station to transmit the data to the access point is the approach A; or when the control information includes an indication that the channel access approach for the specified traffic stream or the specified traffic classification of the station is allowed to be the approach A; and when the traffic stream is added after the control information is received, where the channel access approach for the station to add the traffic stream is the approach B, the channel access approach for the access point to respond to the traffic stream is the approach B, to determine that the channel access approach for the station to transmit the data to the access point is the approach A or the approach B.

The determining module 603 is configured:

when the station adds a traffic stream with the access point, the channel access approach for requesting the traffic stream is an approach B, the control information includes an indication that the channel access approach for the specified traffic stream or the specified traffic classification of the station is allowed to be an approach A and is responded by the access point, to determine the channel access approach for the station to transmit the data of the traffic stream is the approach A; or when the station adds a traffic stream with the access point, the channel access approach for requesting for the traffic stream is the approach A, the control information includes an indication that the channel access approach for the specified traffic stream or the specified traffic classification of the station is allowed to be the approach A and is responded by the access point, to determine the channel access approach for the station to transmit the data of the traffic stream is the approach A.

The determining module 503 is configured:

when the station adds a traffic stream with the access point, an access approach is determined to be an approach B through negotiation, and after the traffic stream is added and when the access point transmits the control information including an indication that the channel access approach for the specified traffic stream or the specified traffic classification of the station is allowed to be an approach A, to determine the channel access approach for the station to transmit the data of the traffic stream is the approach A or the approach B.

The approach A and the approach B are the same or different channel access mechanisms; where the channel access mechanisms include:

a scheduling access mechanism;

an uplink EDCA mechanism; and a hybrid access mechanism of the scheduling access mechanism and the uplink EDCA mechanism.

The scheduling access mechanism includes: data transmission based on polling or access point trigger, and UL MU data transmission based on polling or access point trigger.

The apparatus further includes:

a processing module, which is configured to determine whether to access a wireless network containing the access point to a channel access approach allowable for the specified traffic stream or the specified traffic classification of the station; and/or determine whether to enable the specified traffic stream or the specified traffic classification according to the channel access approach allowable for the specified traffic stream or the specified traffic classification of the station.

In the apparatus embodiment according to the present disclosure, the access point in a wireless network notifies the station of the channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

An embodiment of the present disclosure further discloses a computer program, including a program instruction. The program instruction, when being executed by an access point, causes the access point to perform any one of the wireless network access methods on the access point.

An embodiment of the present disclosure further discloses a storage medium for storing the computer program.

An embodiment of the present disclosure further discloses a computer program, which includes a program instruction. The program instruction, when being executed by a station, causes the station to perform any one of the wireless network access methods on the station.

An embodiment of the present disclosure further discloses a storage medium for storing the computer program.

Other aspects may be understood upon reading and understanding accompanying drawings and detailed description.

Those ordinarily skilled in the art may understand that all or a part of steps of the above embodiments may be implemented by using a flow of a computer program, and the computer program may be stored in a computer-readable storage medium, is executed on a corresponding hardware platform (such as a system, a device, an apparatus, a means and the like), and when being executed, includes one or a combination of the steps of the method embodiments.

Alternatively, all or a part of the steps of the above embodiments may also be implemented by using an integrated circuit, and these steps may be separately fabricated into individual integrated circuit modules, or a plurality of modules or steps among them may be fabricated into a single integrated circuit module. In this way, the present disclosure is not limited to any specific combination of hardware and software.

Each apparatus/functional module/functional unit in the above embodiments may be implemented by employing a general-purpose computing apparatus, which may be centralized on a single computing apparatus, or may be distributed on a network composed of a plurality of computing apparatuses.

When each apparatus/functional module/functional unit in the above embodiments is implemented in a form of a software functional module and sold or used as an independent product, it may be stored in a computer-readable storage medium. The above-mentioned computer-readable storage medium may be a read-only memory, a magnetic disk or an optical disk.

INDUSTRIAL APPLICABILITY

In the present disclosure, the access point in a wireless network notifies the station of the channel access approach for the station to transmit data of a specific traffic stream or a specific traffic classification, thereby flexibly updating a situation, which is stored in the access point, about a buffer of the station, so as to avoid repeated resource scheduling, thereby increasing the utilization rate of resources.

What is claimed is:

1. A wireless network access method, applied to an access point, comprising:
   transmitting, by the access point, control information to a station, wherein the control information comprises a parameter set for a hybrid multi-user access approach that is based on a scheduling access mechanism and an enhanced distributed channel access (EDCA) mechanism; and
   causing, by the access point, the station to perform uplink multi-user transmission of data between the station and the access point such that the uplink multi-user transmission of data is in accordance with the parameter set for the hybrid multi-user approach,
   wherein, the parameter set for the hybrid multi-user access approach includes information indicating that EDCA is disabled for data transmission by the station,
   wherein the information indicating that EDCA is disabled for data transmission by the station is associated with a traffic stream between the station and the access point or a traffic classification between the station and the access point,
   wherein the traffic stream between the station and the access point or the traffic classification between the station and the access point comprises a status indicative of a connection and a connection identification number, and
   wherein the parameter set for the hybrid multi-user access approach includes values associated with a transmission opportunity limit, a minimum contention window, or a maximum contention window.

2. The method of claim 1, wherein the hybrid multi-user access approach is based on a negotiation between the access point and the station.

3. The method of claim 2, wherein the negotiation between the access point and the station includes interactions using an add traffic stream (ADDTS) request frame sent from the station to the access point, and an ADDTS response frame sent from the access point to the station.

4. The method of claim 1, wherein the control information pertains to at least one of: a traffic stream, a traffic classification, an indication of aggregation, a user priority, a response strategy to the traffic stream, or scheduling information.

5. The method of claim 1, wherein the control information is included in a beacon frame, a probe response frame, or a traffic stream change frame.

6. A wireless network access method, applied to a station, comprising:
   receiving, at the station, control information transmitted by an access point, wherein the control information comprises a parameter set for a hybrid multi-user access approach that is based on a scheduling access mechanism and an enhanced distributed channel access (EDCA) mechanism;
   performing, by the station, uplink multi-user transmission of data in accordance with the parameter set for the multi-user approach,
   wherein, the parameter set for the hybrid multi-user access approach includes information indicating that EDCA is disabled for data transmission by the station,
   wherein the information indicating that EDCA is disabled for data transmission by the station is associated with a traffic stream between the station and the access point or a traffic classification between the station and the access point,
   wherein the traffic stream between the station and the access point or the traffic classification between the station and the access point comprises a status indicative of a connection and a connection identification number, and
   wherein the parameter set for the hybrid multi-user access approach includes values associated with a transmission opportunity limit, a minimum contention window, or a maximum contention window.

7. The method of claim 6, wherein the hybrid multi-user access approach is based on a negotiation between the access point and the station.

8. The method of claim 7, wherein the negotiation between the access point and the station includes interactions using an ADDTS request frame sent from the station to the access point, and an ADDTS response frame sent from the access point to the station.

9. The method of claim 6, wherein the control information pertains to at least one of: a traffic stream, a traffic classification, an indication of aggregation, a user priority, a response strategy to the traffic stream, or scheduling information.

10. The method of claim 6, wherein the control information is included in a beacon frame, a probe response frame, or a traffic stream change frame.

11. A wireless network access apparatus, located in an access point comprising:
    a memory for storing instructions; and
    a processor operatively coupled to the memory, wherein the instructions stored in the memory cause the processor to:
    transmit control information to a station, wherein the control information comprises a parameter set for a hybrid multi-user access approach that is based on a scheduling access mechanism and an enhanced distributed channel access (EDCA) mechanism; and
    cause the station to perform uplink multi-user transmission of data between the station and the access point such that the uplink multi-user transmission of data is in accordance with the parameter set for the hybrid multi-user approach,
    wherein, the parameter set for the hybrid multi-user access approach includes information indicating that EDCA is disabled for data transmission by the station, wherein the information indicating that EDCA is disabled for data transmission by the station is associated with a traffic stream between the station and the access point or a traffic classification between the station and the access point, wherein the traffic stream between the station and the access point or the traffic classification between the station and the access point comprises a status indicative of a connection and a connection identification number, and wherein the parameter set for the hybrid multi-user access approach includes values associated with a transmission opportunity limit, a minimum contention window, or a maximum contention window.

12. The wireless network access apparatus of claim 11, wherein the hybrid multi-user access approach is based on a negotiation between the access point and the station.

13. The wireless network access apparatus of claim 12, wherein the negotiation between the access point and the station includes interactions using an ADDTS request frame sent from the station to the access point, and an ADDTS response frame sent from the access point to the station.

14. The method of claim 11, wherein the control information pertains to at least one of: a traffic stream, a traffic classification, an indication of aggregation, a user priority, a response strategy to the traffic stream, or scheduling information.

* * * * *